Oct. 3, 1967   P. BETTS ET AL   3,345,460
SCANNING APPARATUS
Filed July 28, 1964

INVENTORS.
PETER BETTS
JOHN J. LYNOTT
ATTORNEY

United States Patent Office 3,345,460
Patented Oct. 3, 1967

3,345,460
SCANNING APPARATUS
Peter Betts, San Jose, and John J. Lynott, Los Gatos, Calif., assignors to International Business Machines Corporation, New York, N.Y., a corporation of New York
Filed July 28, 1964, Ser. No. 385,572
3 Claims. (Cl. 178—7.6)

This invention relates to apparatus for producing a scanning operation and more particularly to flying spot scanners and scanning cameras.

Heretofore, non-electronic flying spot scanners and scanning cameras have utilized pluralities of rotating, revolving or vibrating mirrors and complex mechanisms for coordinating and synchronizing the movements of the various mirrors. Besides being rather cumbersome and inefficient, such systems have been afflicted by an inherent problem of obtaining curved instead of straight scans. In the past, this problem was not particularly bothersome because the amount of curvature was generally small and the information to be scanned was relatively large. However, the greatest interest and pressure today is toward reducing the size of stored information so as to increase the amount of information stored by a given medium. Thus, as the size of the information to be scanned grows smaller and smaller, the problem of curvature of the scanned path becomes more and more bothersome.

A few systems have compensated for such curvature by writing the information along a curved path corresponding to the path followed by the scanning apparatus. However, this solution reduces the amount of information storable on a given medium and generally restricts the storage medium to use with the particular scanning apparatus for which it is designed to compensate.

Electronic flying spot scanners generally are not subject to the problem of curvature; however, the scanned pattern of such apparatus is dependent upon the characteristics of the electronic components utilized. Since these characteristics change with age, usage, temperature, etc., the scanning accuracy of electronic systems and, therefore, the diminution in size of the information to be scanned are limited accordingly.

Therefore, it is an object of the present invention to provide a scanning apparatus for scanning along a straight-line path.

A further object of the present invention is to provide a simplified mechano-optical scanning apparatus which includes a minimum of moving parts.

An additional object of the present invention is to provide a scanning apparatus for repeatedly and accurately scanning a predetermined, straight-line path over an extended number of repetitions.

Therefore, in accordance with the present invention, there is provided scanning apparatus defining a path of light scanning an object including means revolvable about an axis defining a path of light, means for revolving the revolvable means about said axis so that the path of light is revolved about the axis defining a plane which is essentially perpendicular to the axis, and a mirror or other deflection means fixedly positioned to intersect the plane for deflecting the light at the intersection so that the angle between the axis and the path of light extending between the object and the deflection means depends upon the angular position of the revolving path of light about the axis.

In one embodiment of the invention, a source of collimated light is revolved about an axis so that the light intersects the axis as the light source is revolved, defining a plane which is essentially perpendicular to the axis, and a stationary mirror is situated to intersect the plane of the collimated light to deflect the light onto an object along the axis of rotation. In an alternative embodiment, a light source and the object to be scanned are situated so as to form an image which is projected onto a stationary mirror, and the receiving path is rotated about the axis in a plane essentially perpendicular to the axis so as to scan the image reflected by the stationary mirror.

The foregoing and other objects, features, and advantages of the invention will be apparent from the following more particular description of preferred embodiments of the invention, as illustrated in the accompanying drawings, wherein.

Figure 1:
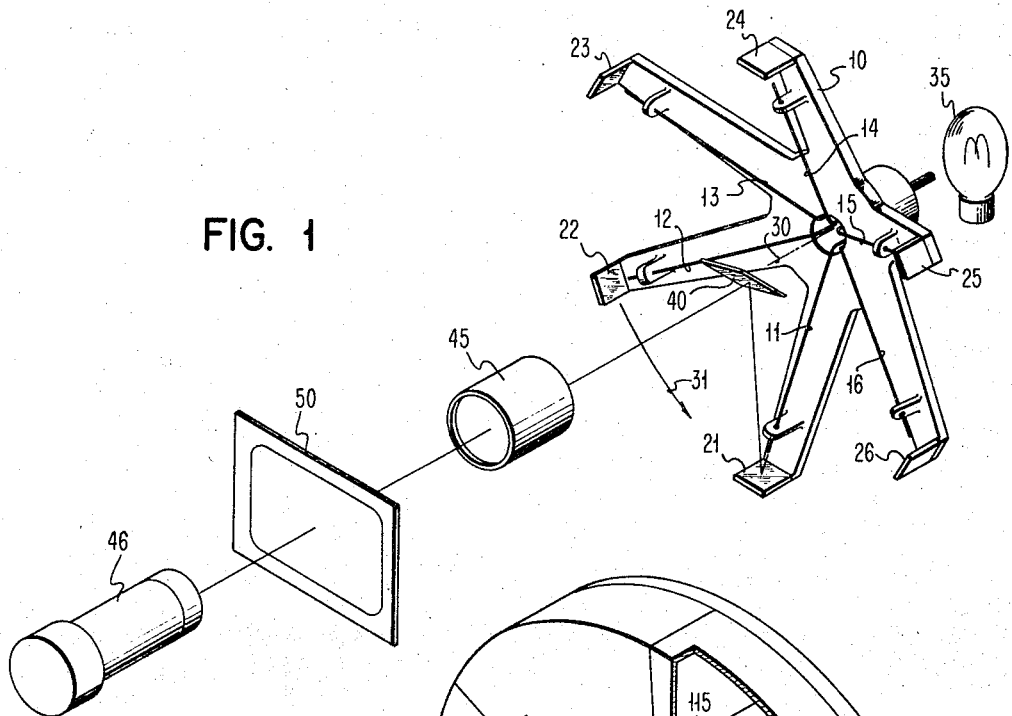
FIGURE 1 is a diagrammatic view of one embodiment of the invention.

Referring first to FIGURE 1, a support member 10 is shown having affixed thereto a plurality of light pipes 11–16 and a plurality of flat mirrors 21–26. Support member 10 is mounted for rotation on a frame (not shown) about an axis 30, and is rotated about axis 30 in the direction of arrow 31 by a motor (not shown) at a constant rotational speed.

A light source 35 is provided which emits light of essentially constant intensity. One end of each of the light pipes 11–16 is pointed toward a light source 35 and transmits a portion of the light therefrom along its length. Each of the light pipes directs the light transmitted therealong toward its associated flat mirror 21–26. Each of the mirrors 21–26 is mounted on support member 10 so as to present an identical angle of deflection with respect to its associated light pipe and thereby reflect the light transmitted by the associated light pipe toward axis 30 to form a plane perpendicular to axis 30.

A mirror 40 is fixedly mounted on a frame (not shown) and intersects the plane formed by light paths.

A lens system 35 and a photocell 46 are fixedly mounted on the frame (not shown) in the path of light reflected by mirror 40. A microfilm slide is placed in the light path between lens system 45 and photocell 46. Thus, as support member 10 is rotated in the direction of arrow 31, each mirror and light pipe mounted thereon sequentially scan a light beam horizontally across the width of microfilm slide 50.

In synchronism with the rotation of support member 10, microfilm slide 50 is sequentially stepped in the vertical direction so that each set of a mirror and a light pipe scans across microfilm slide 50 in a line vertically displaced from the previous set.

The critical aspect of the invention is that the plane defined by the light path from each of mirrors 21–26 must be perpendicular to axis 30 in order to obtain a perfectly straight scan across the width of microfilm slide 50. This is because, as viewed from any position along a line formed by the intersection of mirror 40 and the plane defined by the revolving light paths, the angle of incidence of the beam of light at mirror 40 is exactly the same regardless of the angular position of the mirrors 21–26 about axis 30. Thus, since the angle of incidence is identical, the angle of departure is also identical and the light reflected by mirror 40 remains in the same plane, which, in the apparatus of FIGURE 1, is horizontal.

If it is not important that the scan is along a perfectly straight line, the intersection of the path of light from mirrors 21–26 need not be perfectly perpendicular to axis 30. If the light paths vary slightly from the perpendicular, the scan assumes an almost negligible amount of curvature.

In operation, a portion of the light from light source 35 is transmitted by light pipe 11 and directed toward mirror 21. Mirror 21 deflects the light toward mirror 40, which then deflects the light to lens system 45. Lens system 45 focuses the light on microfilm slide 50, and microfilm slide 50 blocks or transmits the light therethrough depending upon its opacity at the intersection of the light therewith. Photosensitive cell 46 then provides an electrical output signal corresponding to the portion of the light transmitted through microfilm slide 50.

As support member 10 is rotated in the direction of arrow 31, the light beam formed by light pipe 11, mirrors 21 and 40, and lens system 45 is swept horizontally across microfilm slide 50. In this manner, photocell 46 provides an electrical output representative of the data recorded on the scanned area of microfilm slide 50.

As support member 10 continues to rotate, the beam formed by light pipe 11 and mirror 21 is swept off microfilm slide 50 and microfilm slide 50 is incremented vertically. At this time, a beam formed by light pipe 12 and mirror 22 begins a scan across microfilm slide 50 incrementally below the previous scan. Upon completion of that scan, microfilm slide 50 is again incremented vertically and a scan by light pipe 13 and mirror 22 is initiated. The scanning and incrementing of microfilm slide 50 continues as the entire slide is eventually scanned.

Assuming that a slight amount of curvature of scan may be tolerated, the apparatus described above may easily be changed to accomplish a similar raster scanning of microfilm slide 50 without the synchronized incrementing of the microfilm slide. This is accomplished by mounting mirrors 21–26 so that each one deflects the light from its associated light pipe at a slightly different angle. Therefore, each such beam of light strikes mirror 40 at a slightly different angle and is deflected so as to scan microfilm slide 50 along a horizontal line displaced vertically from each other. If the mirrors 11–16 are sequentially angled, the light beams therefrom scan microfilm slide 50 in a raster-like pattern.

Figure 2:
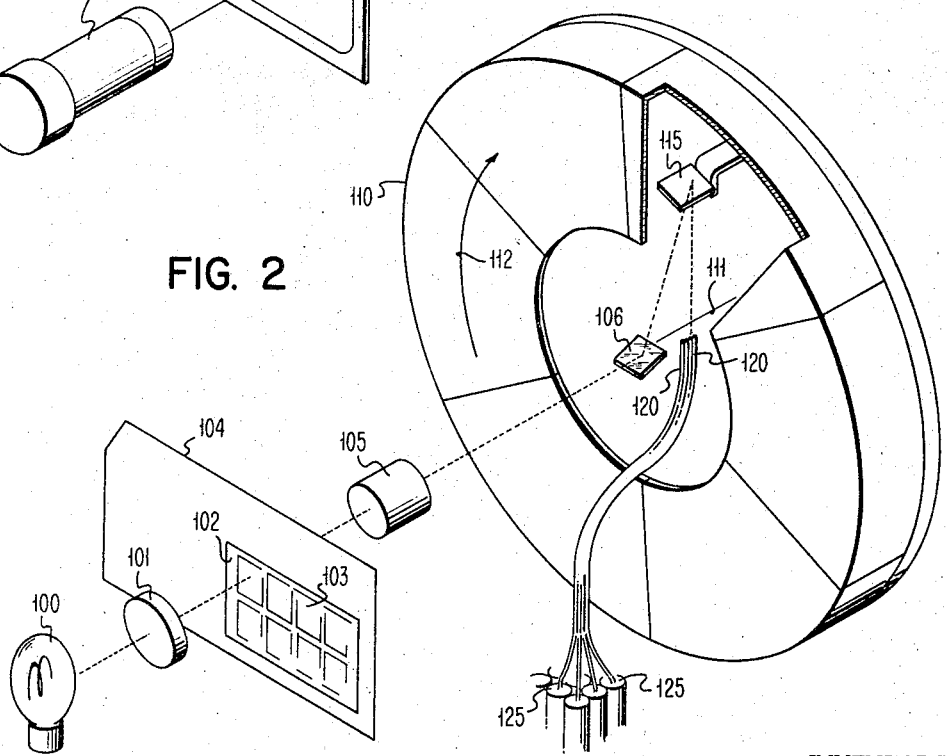
FIGURE 2 is a diagrammatic view of a second embodiment of the invention.

Referring now to FIGURE 2, the scanning apparatus illustrated is similar to that of FIGURE 1, the primary difference being that the light source 35 and photocell 46 of FIGURE 1 are interchanged.

Specifically, the light source 100 is focused by lens 101 on a frame 102 of a microfilm slide 103 as contained in aperture card 104. Lens 101 is arranged such that the light from light source 100 is evenly distributed over the entire area of frame 102. A lens system 105 is situated between aperture card 104 and a fixedly mounted mirror 106.

A support member 110 is mounted for rotation about axis 111. A motor (not shown) rotates support member 110 about axis 111 in the direction of arrows 112 at a uniform rotational speed. A plurality of mirrors 115 are mounted around the inner periphery of support member 110. These mirrors are equally spaced and their centers all lie in a common plane which is perpendicular to axis 111 and which intersects mirror 106 at approximately the center thereof. The image produced by lens system 105 of frame 102 is deflected by mirror 106 toward mirror 115. Mirror 115 deflects the image toward a linear array of light pipes situated near axis 111. Each one of the light pipes 120 is connected to a corresponding photocell 125 and transmits light received from mirror 115 to the photocell.

Thus, the image formed by lens system 105 of frame 102 is deflected essentially vertically by mirror 106 and mirror 115 scans across the image, deflecting portions of the image to light pipe 120. In this manner, mirror 115 scans horizontally across frame 102. Each of the light pipes 120 in the linear array corresponds to the particular vertical increment of frame 102; and, as mirror 115 is swept across the image, each of the light pipes is essentially sweeping a horizontal line across the image of frame 102.

In operation, therefore, light source 100 and lens 101 illuminate frame 102, and lens system 105 projects an image of frame 102 onto mirror 106 which deflects the image vertically. Lens 115 then scans across the image, and directs the scanned portion to light pipe 120. Thus, one scan by mirror 115 and light pipes 120 accomplishes a complete scan of frame 102, and further scans of other mirrors 115 merely repeats the complete scan of frame 102.

It will be understood that the linear array of light pipes 120 is merely a multiplexing means allowing the entire frame 102 to be scanned at one time, and that a similar multiplexing arrangement may be applied to the embodiment of the scanner shown in FIGURE 1.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An optical parallel line scanning apparatus for optically sequentially scanning an object in parallel fashion, comprising:
   a rotatable support means;
   a means for rotating said rotatable support means in a circular path about an axis of rotation, said circular path defining a plane which intersects and is essentially perpendicular to said axis;
   a stationary deflection means situated within said circular path; and
   a plurality of light sources mounted on said rotatable support means, each of said light sources being directed inwardly toward said stationary light deflection means and said axis of rotation at a different angle with respect to said axis;
   said stationary light deflection means and each said light source defining a light path when said rotatable support means is in a predetermined portion of said circular path corresponding to one of the parallel line scans of said object;
   whereby several parallel line scans on the object can be scanned without incrementing said object.

2. An optical parallel line scanning apparatus for sequentially scanning an object in parallel fashion, comprising:
   a plurality of light directing means;
   means for revolving said light directing means in a circular path about an axis of rotation, said circular path defining a plane intersecting and essentially perpendicular to said axis;
   a stationary deflection means situated inwardly of said circular path to intersect said plane;
   means supporting each of said light directing means in light paths interesecting said axis of rotation and said stationary deflection means;
   each of said light directing means at a different angle with respect to said axis of rotation;
   said stationary light deflection means and each of said light directing means defining a light path corresponding to one of the parallel line scans of said object when each said light directing means is in a predetermined portion of said circular path whereby several parallel lines on the object can be sequentially scanned without incrementing said object.

3. An optical parallel line scanning apparatus for sequentially scanning an object in parallel fashion, comprising:
   a light source;
   a photo detector;
   a plurality of light directing means;
   means for revolving each of said light directing means in an endless path about an axis of rotation, said endless path defining a plane which is essentially perpendicular to said axis of rotation;

means for supporting each of said light directing means so as to direct light at a different angle with respect to said axis of rotation;

a stationary light deflection means positioned inwardly of said endless path and intersecting said plane;

means for supporting each of said light directing means in a light path between said stationary light deflection means and said photo detector during a predetermined portion of said endless path;

said object positioned in said light path between said light source and said stationary light deflection means;

said stationary light deflection means and each of said light directing means defining a light path when each of said light directing means is in a predetermined portion of said endless path, and each said light directing means corresponding to one of the parallel line scans of said object;

whereby several parallel line scans on the object can be scanned without incrementing said object.

References Cited
UNITED STATES PATENTS

| | | | |
|---|---|---|---|
| 2,089,588 | 8/1937 | Von Mihaly | 178—7.6 |
| 3,064,077 | 11/1962 | Cary | 178—7.6 |
| 3,235,660 | 2/1966 | Treseder | 178—7.6 |
| 2,840,632 | 6/1958 | Parker | 178—6 |
| 2,949,536 | 8/1960 | Langton | 88—1 |
| 3,100,242 | 8/1963 | Herbert | 178—7.6 |
| 3,153,723 | 10/1964 | Weiss | 250—236 |

JOHN W. CALDWELL, *Primary Examiner.*

DAVID G. REDINBAUGH, *Examiner.*

J. A. ORSINO, *Assistant Examiner.*